UNITED STATES PATENT OFFICE.

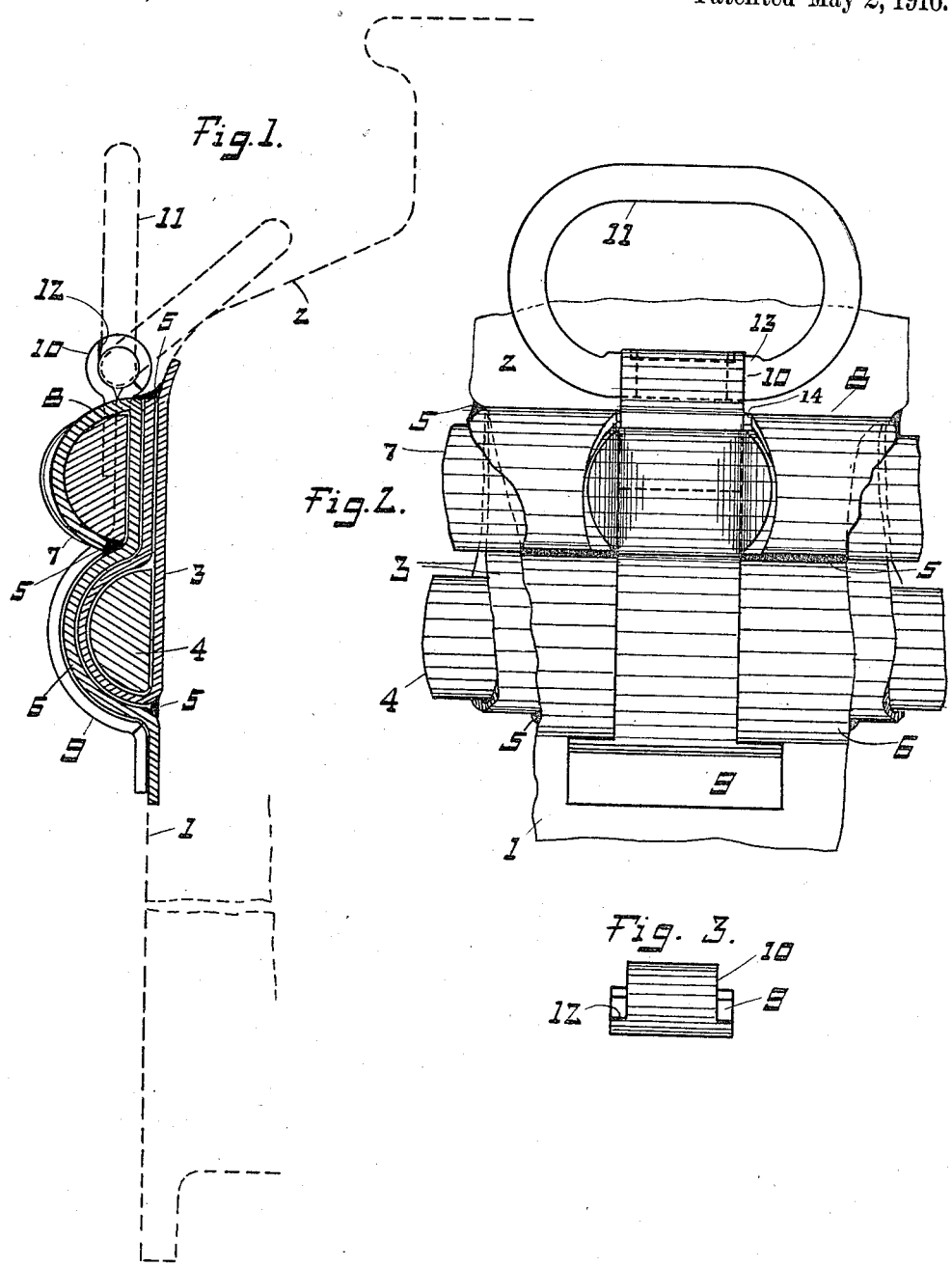

ROBERT O. THOMPSON, OF CAMPBELL HALL, NEW YORK.

STORAGE VESSEL.

1,181,621.  Specification of Letters Patent.  Patented May 2, 1916.

Application filed July 23, 1914. Serial No. 852,583.

*To all whom it may concern:*

Be it known that I, ROBERT O. THOMPSON, a citizen of the United States, and a resident of Campbell Hall, in the county of Orange and State of New York, have invented certain new and useful Improvements in Storage Vessels, of which the following is a specification.

My invention relates to an improvement in storage vessels, and particularly milk cans, which are made of sheet metal, and used for the purpose of shipping the milk from the dairy to places of distribution; and the primary object of my invention is to produce a milk can which will have its parts sealed together at a plurality of points, and which will be constructed so as to have the greatest attainable strength and resisting power; whereby it will be practically impossible to damage the can by rough handling or usage to the extent of making it leak and lose any of its contents.

Other objects and advantages of my invention will appear from the following description, taken in connection with the accompanying drawings, which illustrate an embodiment of my invention; the same characters of reference being used to indicate the same parts throughout the several views.

On said drawings Figure 1 is a view showing one side of a milk can in outline; and illustrating in section the manner in which the top and body of the can are secured together and the can strengthened in accordance with my invention; Fig. 2 is a front view of the parts shown in section on Fig. 1; and Fig. 3 is a top plan of a detail of my invention, showing a bearing for a handle.

In the particular description of the drawings, the numeral 1 is employed to indicate the body or main portion of the can; and the numeral 2 the top of the same. The part 2 is usually called the "bowl," and it comprises the shoulder, the neck, and the mouth, through which the can is filled and emptied. My invention is principally concerned with the manner in which the body and the bowl are jointed together and partly with the disposition of the lifting handles of the can with a view to making them drop inward automatically against the shoulder of the bowl when the can is not being moved about; and thus prevent the handles from getting damaged or broken. The bottom of the can will be secured to the body in the usual way.

In the ordinary milk can, the portion of the bowl 2 which is below the shoulder thereof fits down over the upper edge of the body 1, and is soldered thereon. If the can should receive a heavy shock at a point below the seam between the bowl 2 and body 1, the body can easily be torn loose from the solder, and the upper edge of the body forced inward away from the bowl 2. A considerable opening can be produced in this way and much if not all of the contents of the can be lost. I aim to eliminate such a danger in my improved can by using a special form of joint to connect together the parts in question; this joint being made leak-proof and likewise strengthened to the required degree. I therefore extend the lower portion of the bowl or top 2 a considerable distance downward below the shoulder of the same. This lower portion is indicated by the numeral 3; and I provide the same with a reinforement, some distance above the lower edge, as by means encircling it with a strip or band 4. This band is semi-circular or semi-elliptical in cross-section; and has its flat side in contact with the bowl, as plainly shown in Fig. 1. The portion 3 below the band 4 is bent upward and outward, and then inward and upward over the band, so as to inclose the same entirely; and it is then bent upward against the outer surface of the bowl to a point not far from the shoulder, the lower portion thus being, in effect returned outward upon itself.

When the body 1 and the bowl 2 are joined together the latter is fitted into the former, and the upper portion of the body is expanded sufficiently to receive the portion 3. The inner surface of the body and the bowl will be flush with each other when the can is finished; and the space or seam between the bowl and the body inside the can will be sealed with solder 5 or some other suitable substance. I indicate the expanded upper portion of the body 1 by the numeral 6; and this portion extends upward and outward, and then upward and inward over the bulge formed by the band 4; and finally upward along the extremity of the portion 3 which is in contact with the outside surface of the bowl 2 just below the shoulder of the same. I provide the upper portion of the body with a reinforcement, such as a second strip or band shown at 7; this band being located above the first band 4; and being of such diameter as to hold the edge of the upper portion 6 of the body 1 and the edge of the lower portion 3 of the bowl 2 tightly together against the shoulder of the bowl 2. I also bend the edge of the upper portion 6 outward and downward, as shown at 8, substantially to the bottom of the band 7, so as to cover the same.

When the band 7 is in place, and the edge 8 turned down over it, I solder the edge 8 and the bottom of the band 7 together to the portion 6. This solder is indicated at 5; hence no moisture can get behind the band 7, and the likelihood of rusting is eliminated. Likewise the spaces or seams between the upper portion 6 of the body and the edge of the portion 3, and between the edge of the portion 3 and the outside surface of the bowl are closed by solder. Thus the joint between the body 1 and bowl 2 is sealed perfectly on both the inside and the outside of the vessel; and moreover the joint between the two parts named is of such construction that it cannot possibly be broken open by any force short of that which is necessary to demolish the can entirely. Of course, I may dispense with the outturned edge 8, and use one continuous soldering from the band 7 to the bowl 2, if preferred.

It will now be apparent that my improved can is as strong as it is possible to make the same; and under ordinary conditions, the bands 4 and 7 will take care of any blow or shock that might damage the vessel to the extent of causing it to leak and lose any of its contents. Bands 7 and 4 and the portions 3, 6 and 8 covering them project slightly from the side of the body; and therefore will naturally receive most of the blows, bumps and jars that are incurred when the can is handled to move the same about when full; and the strength of the reinforcing bands will of course make the crushing of the can or the indenting thereof exceedingly unlikely. Furthermore, should the can receive a blow on the bowl 2 above the band 7, or on the side of the body below the band 4; any indentation short of an actual rupture of the sheet metal of which the can is made cannot impair the efficiency of the joint between the bowl 2 and body 1. For example, if the bowl 2 be punched inward so as to tear it loose at any point from the solder 5 at the edge of the portion 3, the solder 5 between the portion 6 and the portion 3 will still seal the joint, and so will the solder 5 inside the can. Likewise, if the body 1 is punched in beneath the band 4, it is very improbable that the body will be torn loose from the inside solder 5; and even if it should be torn from the solder 5 inside, below the band 4, the solder outside above the band 7 will keep the joint perfectly tight and leakproof. The joint between the body and the bowl is not only sealed; but the structure of the joint is such as to make the destruction of the sealed effect practically an impossibility.

I also construct my improved can so that, in addition to the advantages above mentioned, the weight of the same and its contents will be borne entirely by the body 1 when the can is moved about or lifted. To this end I secure handle straps 9 to the body 1; bending the upper band 7 outward slightly at points adjacent the straps, to allow the straps to pass behind it. These straps 9 are formed like an inverted T; and their widened lower ends are soldered to the sides of the body below the upper portion 6. They extend upward in snug contact with the portion 6, behind the band 7; and are turned over at their upper ends and downward behind the band to form bearings 10 for handles 11. When the handles are grasped to move the can, the weight is exerted partly upon the portion 6 and partly upon the band 7, and the bowl 2 receives no stress whatever. This also promotes the permanence of the sealed joint between the bowl and the body of my can. The edge 8 may be notched as in Fig. 2 to accommodate the straps 9; or simply bent up behind them without notching.

It is desirable also in this class of storage vessels to guard against the handles getting broken off by usage; and I therefore mount the handles 11 in the bearings 10 in such a manner that they automatically fall inward and rest upon the bowl 2 when they are not needed. Each bearing 10 has shoulders 12 for this purpose, and the handles have projections 13 which will engage the shoulders and limit the outward movement of the handles. When the handles are grasped, they will be in contact with the shoulders, and be substantially vertical. But when the can is set down anywhere and released, the handles will rotate inward under the influence of gravity, and thus automatically put themselves out of harm's way. The shoulders 12 may be so located as to allow the handles 11 to come fully into vertical position when the can is lifted, as the slightest jar to the can when it is set down again will be enough to cause the handles to drop as required.

My improved can is therefore an exceedingly simple and practical affair, perfectly tight, and of the strongest possible design; so that the likelihood of damage to any of the parts is reduced to a minimum. It can be easily and cheaply made; and has a life much longer under the usual conditions of service than any of the vessels now used in the dairying industry. I wish to call attention here to the fact that the construction of my can would still be unusually strong even if the bands 4 and 7 were entirely dispensed with. In other words, the joint between the bowl and the body might be made without reinforcing bands, and the portions 3 and 6 caused to extend straight up along the outside of the bowl, without sacrificing too many of the advantages of my inventive idea.

The notches in the edge 8, above referred to, for the handle straps, are indicated by the numeral 14 on Fig. 2. I may of course use solder along the edges of these notches or recesses also, if desired, in order to seal the edge 8 at all points to the band 7; but I have not deemed it necessary to show any solder at the notches 14 on the drawings.

I wish to have it understood that I do not limit myself to the exact details herein shown and described, but reserve the right to make such changes in the shape, size and arrangement of parts as come within the general meaning of the terms in which the appended claims are expressed. In other words, the differences in the phrasing of the claims are intended to cover differences in the construction of my improvement that are within the scope and spirit of my invention.

Having described my invention, what I believe to be new and desire to secure and protect by Letters Patent of the United States is:—

1. A storage vessel comprising a body and a top making a leakproof joint, the body having an expanded rim comprising a portion extending outward and a portion of less diameter provided with a reinforcement, the said rim receiving the top.

2. A storage vessel comprising a body and a top received thereby, said top and body making a leakproof joint, the top and the body each having a peripheral reinforcement, the reinforcement of the top being encircled by the body, and the reinforcement of the body being located beyond the rim of the top.

3. A storage vessel comprising a body and a top making a leakproof joint, the top being its periphery provided with a reinforcement, and the body having an expanded rim receiving the top and said reinforcement, the body also being provided with a reinforcement located above the reinforcement of the top.

4. A storage vessel comprising a body and a top making a leakproof joint, the top having a reinforcing strip on its periphery and having its edge turned outward and over said strip, and the body being expanded to receive the top and its reinforcing strip.

5. A storage vessel comprising a body and a top making a leakproof joint, the top having on its periphery a reinforcing strip and the body having an expanded rim receiving the top and its strip, and a second reinforcing strip upon the rim of the body, located above the first reinforcing strip.

6. A storage vessel comprising a body and a top making a leakproof joint, the body having an expanded rim to receive the top, and a reinforcing strip upon the expanded rim, the upper edge of said rim being turned down upon said strip.

7. A storage vessel comprising a body and a top making a leakproof joint, the top having on its periphery a reinforcing strip, the lower edge of the top being turned up over said strip, and the body having an expanded rim receiving the lower edge of the top with said reinforcing strip, said rim extending above said strip, and a second reinforcing strip encircling the expanded rim of the top and being located above the first reinforcing strip, the upper edge of the rim being turned down upon the second reinforcing strip.

8. A storage vessel comprising a body and a top therefor, the top having its lower portion extending outward, and then upward along the outer surface of the said lower portion, the body having its upper portion extending outward and upward, and then inward and upward to form a snug fit with the lower portion of the body.

9. A storage vessel comprising a body and a top therefor, the top having its lower portion extending outward, and then upward along the outer surface of said lower portion, the body having its upper portion extending upward and outward, and then inward and upward to form a snug fit with the lower portion of the body, and means for sealing the joint between the body and the top on both the inside and the outside of the vessel.

10. A storage vessel comprising a body and a top, making a leakproof joint, a reinforcing band for the top near its lower edge, and a reinforcing band for the body near the upper edge of the latter.

Signed at Goshen, in the county of Orange and State of New York, this 13th day of July, A. D. 1914.

ROBERT O. THOMPSON.

Witnesses:
J. F. HALSTEAD,
W. H. CUNNEYS.

Copies of this patent may be obtained for five cents each, by addressing the "Commissioner of Patents, Washington, D. C."